United States Patent
Owen et al.

[19]

[11] Patent Number: 6,082,801
[45] Date of Patent: Jul. 4, 2000

[54] TAILGATE EXTENSION ASSEMBLY

[76] Inventors: James M. Owen, P.O. Box 309, Liberty, N.C. 27298; J. Ben Owen, 2507 Shady Lawn Dr., Greensboro, N.C. 27408

[21] Appl. No.: 09/178,668

[22] Filed: Oct. 26, 1998

[51] Int. Cl.[7] ........................................... B62C 1/06
[52] U.S. Cl. .................... 296/26.11; 296/26.08; 296/57.1
[58] Field of Search ............. 296/26.08, 26.11, 296/57.1, 26.04, 26.06

[56] References Cited

U.S. PATENT DOCUMENTS

| | | | |
|---|---|---|---|
| 1,635,422 | 7/1927 | Keesee . | |
| 1,707,889 | 4/1929 | Williams . | |
| 2,712,470 | 7/1955 | Cardini | 296/26 |
| 2,783,080 | 2/1957 | Ringsby | 296/50 |
| 2,961,271 | 11/1960 | Morris | 296/50 |
| 4,114,944 | 9/1978 | Joynt et al. | 296/50 |
| 4,472,639 | 9/1984 | Bianchi | 296/26.11 |
| 4,531,773 | 7/1985 | Smith | 296/26.11 |
| 5,154,470 | 10/1992 | Bringman, Jr. | 296/26.11 |
| 5,468,038 | 11/1995 | Sauri | 296/26.11 |
| 5,478,130 | 12/1995 | Matulin et al. | 296/57.1 |
| 5,518,286 | 5/1996 | McCormack | 296/57.1 |
| 5,658,033 | 8/1997 | Delaune | 296/26.08 |
| 5,669,654 | 9/1997 | Eilers et al. | 296/26.11 |
| 5,700,047 | 12/1997 | Leitner et al. | 296/26.11 |
| 5,732,995 | 3/1998 | Piccariello | 296/57.1 |
| 5,741,039 | 4/1998 | Habdas | 296/26.11 |
| 5,752,800 | 5/1998 | Brincks et al. | 296/26.11 |
| 5,765,892 | 6/1998 | Covington | 296/26 |
| 5,775,759 | 7/1998 | Cummins | 296/26.11 |
| 5,788,311 | 8/1998 | Tibbals | 296/26.11 |
| 5,806,907 | 9/1998 | Martinus et al. | 296/26.11 |
| 5,816,638 | 10/1998 | Pool, III | 296/26.11 |
| 5,820,188 | 10/1998 | Nash | 296/26.11 |
| 5,826,932 | 10/1998 | DeSimone | 296/26.11 |
| 5,857,724 | 1/1999 | Jarman | 296/26.11 |
| 5,911,464 | 6/1999 | White | 296/26.11 |
| 5,918,925 | 7/1999 | Perrin | 296/26.11 |
| 5,941,588 | 8/1999 | Maraconi | 296/26.11 |

OTHER PUBLICATIONS

Happy Hollow, Inc. internet information; Copyright 1996.
AMP Research, Bed X–Tender Internet information; Motocross Action Rating Sep. 1996.
Daws Better Built Co., Internet information on Bumper Buddy Folding Aluminum Cargo Carrier, undated.

*Primary Examiner*—Joseph D. Pape
*Assistant Examiner*—Kiran Patel
*Attorney, Agent, or Firm*—Rhodes, Coats & Bennett, LLP.

[57] ABSTRACT

An extension mechanism for mounting on a tailgate of a vehicle that is selectively positionable between a variety of orientations. The extension mechanism includes a tailgate protector mounted onto the vehicle tailgate, an extender frame movably attached to the tailgate protector allowing for separate movement of the extender frame relative to the tailgate protector. Support arms extend between the vehicle and the extender frame for selectively positioning said extender frame relative to the vehicle tailgate and also supporting the extender frame. The extension mechanism is positionable in a variety of orientations including a first position in which the vehicle tailgate and said extender frame are both horizontally positioned, a second position in which the vehicle tailgate is horizontally positioned and said extender frame is vertically positioned, a third position in which the vehicle tailgate is vertically positioned and said extender frame is vertically positioned, and a fourth storage position in which the vehicle tailgate is in a vertical position and said extender frame is folded adjacent the vehicle tailgate.

23 Claims, 5 Drawing Sheets

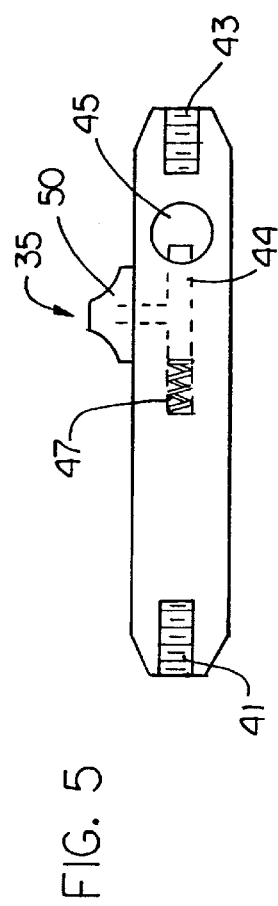
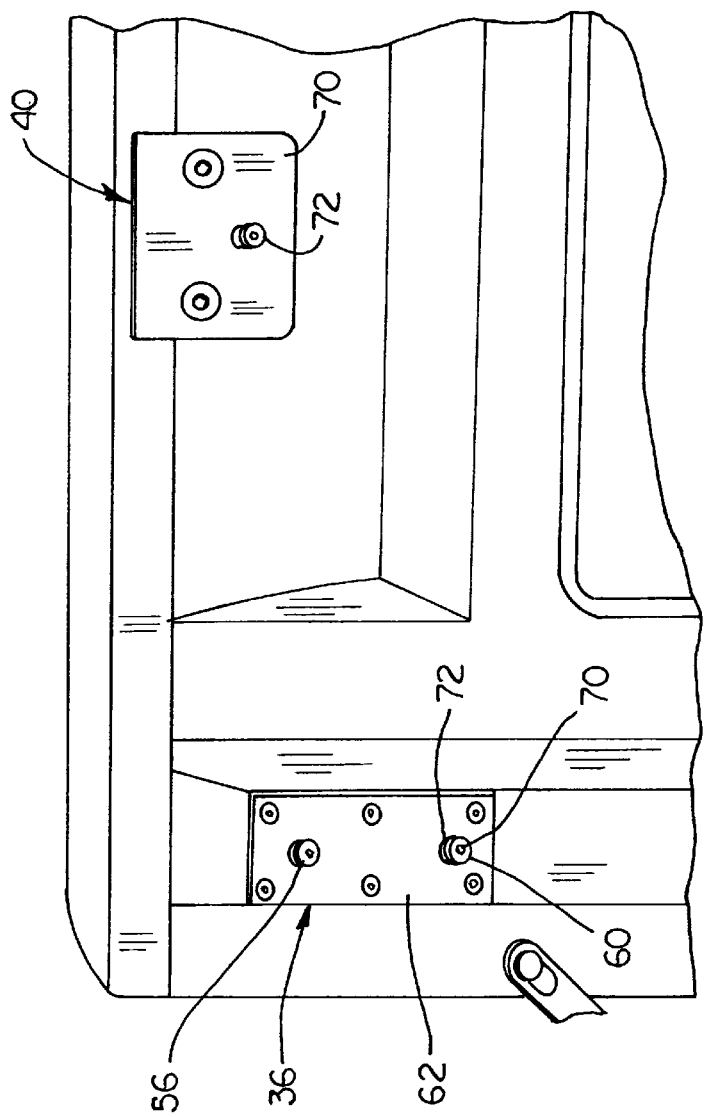

TAILGATE EXTENSION ASSEMBLY

BACKGROUND OF THE INVENTION

1. Field of the Invention

The present invention relates generally to a tailgate extension assembly and, more particularly, to an extension assembly mounted to a vehicle tailgate being selectively positionable in a variety of orientations.

2. Description of the Prior Art

Vehicles such as pickup trucks, or other cargo vehicles include beds for hauling materials and tailgates for retaining the materials within the beds. The vehicle bed generally includes some type of horizontal platform with side walls or rails extending upwardly from either side and upright corner posts which extend upwardly from the rear corners of the platform and support the rear end of the side walls. The vehicle tailgate is generally hingedly attached to the rear end of the platform and is selectively attachable to the corner posts to maintain the tailgate in the closed position. The tailgate can be either in a vertical, closed orientation or in a horizontal, open position depending upon the specific requirements of the job. Materials are often longer than the length of the bed requiring either the tailgate remain open which may result in the material falling out the back of the vehicle, or closing the tailgate and setting the material on the top edge of the tailgate and extending beyond the bed. In either orientation, the user is required to perform additional time consuming steps such as securing the materials within the bed by rope, tape, or other means to properly secure the materials.

To overcome this problem, several different types of extension devices have been developed. Many of these previous extension devices include panels mounted directly to the vehicle tailgate. When loads are placed onto the extension device, the weight is directly transferred to the vehicle tailgate which may not be designed to support excessive weight resulting in the tailgate bending or otherwise becoming damaged and non-useable. Many previous designs include side members that extend between the end of the vehicle and the extension. However, these function to maintain the materials within the cargo bed and provide little additional support to the tailgate.

Another drawback of previous extension devices is the lack of adjustability to contain a variety of materials placed in the vehicle bed. Previous designs provide for vertical extension above the cargo bed, or horizontal extension for support beyond the bed length, but not both. Therefore, a person would be limited in the type of materials that could fit into the bed of the vehicle.

The extension device is permanently mounted to the vehicle and is not removed when not in use. Previous designs are often large and cumbersome and cannot be easily stored away when not in use. These devices take up large amounts of room in the cargo area and often make it difficult to access the cargo area as they are mounted on the tailgate and block the area from the rear of the vehicle.

SUMMARY OF THE INVENTION

The present invention is generally directed to a tailgate extension mounted on the tailgate of a cargo vehicle, such as a pickup truck, providing for enhanced load handling capacities. The invention provides the user with a variety of support options to best contain materials that are stored in the cargo area of the vehicle. An extender frame that is attached to the vehicle may extend horizontally beyond the vehicle tailgate for carrying long loads and also extend vertically above the vehicle tailgate to contain high loads.

In one embodiment, the extension mechanism includes a tailgate protector mounted onto the vehicle tailgate, and an extender frame movably attached to the tailgate protector allowing for separate movement of the extender frame relative to the tailgate protector. In another embodiment of the present invention, the tailgate extension assembly includes an extender frame attached directly to the edge of vehicle tailgate. The extender frame is selectively positionable between a variety of orientations relative to the tailgate including extending beyond the width of the tailgate. Support members extend between the vehicle and the extender frame for supporting the extender frame in the variety of load-bearing orientations. In either embodiment, support arms extend between the side walls of the vehicle and the side edge of the extender frame for selectively positioning and also supporting the extender frame relative to the vehicle tailgate.

The extension mechanism is positionable in a variety of orientations including a first position in which the vehicle tailgate and said extender frame are both horizontally positioned, a second position in which the vehicle tailgate is horizontally positioned and said extender frame is vertically positioned, a third position in which the vehicle tailgate is vertically positioned and said extender frame is vertically positioned, and a fourth storage position in which the vehicle tailgate is in a vertical position and said extender frame is folded adjacent the vehicle tailgate.

Preferably, a tailgate protector is positioned over the vehicle tailgate. The tailgate protector includes a lip section that wraps about the edge of the vehicle tailgate and a plate section that extends across the surface of the vehicle tailgate. The tailgate protector is attached to the vehicle tailgate and maintained in position by fasteners that extend through the protector into the tailgate. The extender frame may be pivotably connected to the tailgate protector providing for positioning the extender frame at a variety of orientations relative to the said tailgate protector.

The present invention is further directed to an extension assembly that increases the usable space of a vehicle cargo area. The extension assembly includes an extender frame movably connected to the vehicle tailgate that is selectively positionable in a first orientation in which the extender frame extends beyond the vehicle tailgate and a second orientation in which the extender frame is positioned substantially perpendicular to the vehicle tailgate. At least two pairs of support members extending between the vehicle and the extender frame to provide strength and support to the extender frame.

Preferably, the extender frame has a width substantially equal to or slightly less than the width of the vehicle tailgate and a height substantially equal to or slightly less than the height of the vehicle tailgate. The dimensions of the extender frame being substantially equal to or slightly less than the width and height of the vehicle tailgate provides for maximizing the amount of storage space. It will be understood that the dimensions of the extender frame should be sized to allow the vehicle tailgate to close. The extender frame may be constructed of an open grid structure to allow for airflow through the extender frame. The support arms extend between the vehicle and a pivoting hinge connected to an edge of the extender frame. The pivoting hinges allow for the support arms to fold against the extender frame when not in use and are housed in catches mounted to the extender.

Catch mechanisms may be attached to the support arms and include at least one aperture which mates with a stud positioned along the bed rails of the vehicle. The apertures may include a locking mechanism having a spring loaded catch for connecting with the studs. In one embodiment, the support arms include at least two catch mechanisms spaced apart along the length of the support arms to provide for selective positioning of the support arms.

BRIEF DESCRIPTION OF THE DRAWINGS

FIG. 5 is a side cut-away view of a catch mechanism having a single aperture; and FIG. 6 is a side perspective view of a vehicle cargo area having a post plate and a rail plate.

DESCRIPTION OF THE PREFERRED EMBODIMENTS

Figure 1:
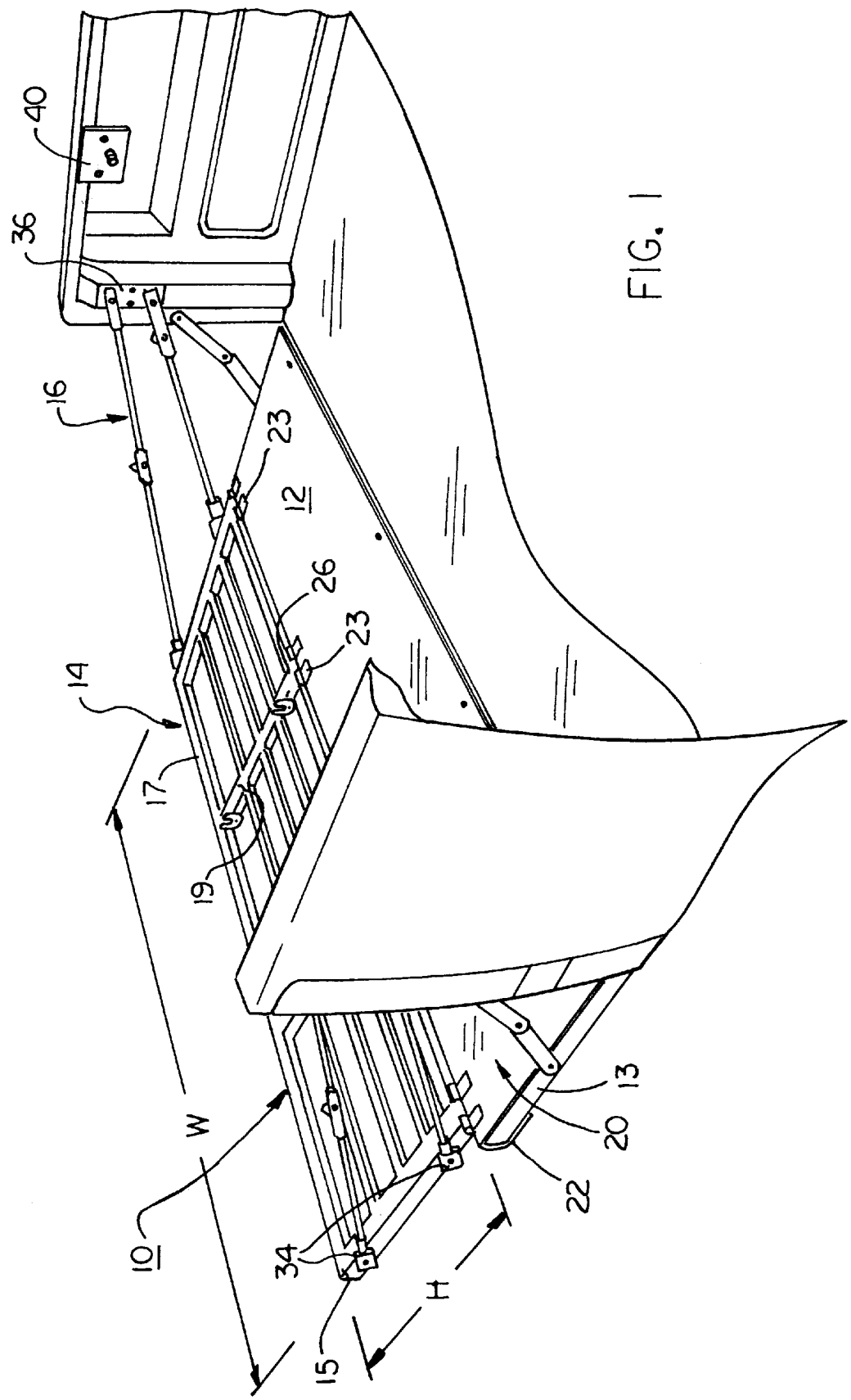
FIG. 1 is a perspective view of the tailgate extension assembly constructed according to the present invention wherein the assembly is in a first position.

In the following description, like reference characters designate like or corresponding parts throughout the several views. Also in the following description, it is to be understood that such terms as "forward," "rearward," "left," "right," "upwardly," "downwardly," and the like are words of convenience and are not to be construed as limiting terms.

Referring now the drawings in general and FIG. 1 in particular, it will be understood that the illustrations are for the purpose of describing a preferred embodiment of the invention and are not intended to limit the invention thereto. As best seen in FIG. 1, a tailgate extension assembly, generally designated 10, is illustrated. The tailgate extension assembly 10 includes a tailgate protector 12, an extender frame 14 and at least one pair of support arms 16.

Figure 4:
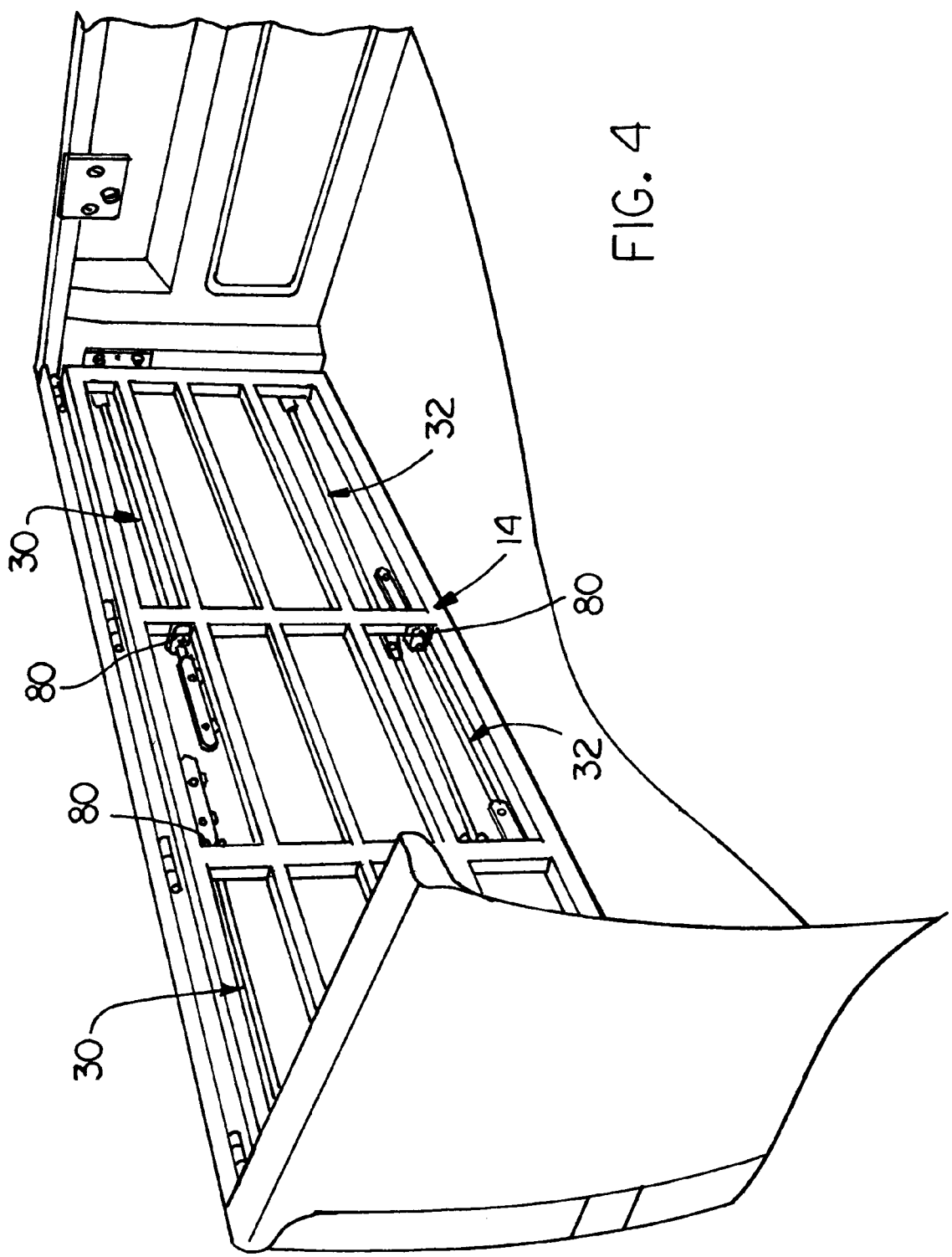
FIG. 4 is a perspective view of the tailgate extension assembly in a fourth position.

The extender frame 14 is attached to the vehicle tailgate 13. The extender frame 14 has an open grid structure having members 15, 17 in spaced relation to provide gaps in between providing for airflow through the extender frame thus increasing fuel economy for the vehicle. The extender frame width and height, illustrated as w and h in FIG. 1, are sized to allow for the tailgate to close and for the tailgate to close and allow for the extender frame to pivot directly against the vehicle tailgate in a storage position, as illustrated in FIG. 4.

Hinge elements 26 are positioned on the lower edge of the extender frame 14 for pivotably mounting to the vehicle in a rather conventional hinge connection. In one embodiment, the extender frame 14 is attached directly to the vehicle tailgate 13. In another embodiment, the extender frame 14 is pivotably connected to the protector plate 12 which is positioned directly over the vehicle tailgate. In both embodiments, however, the extender frame 14 is pivotably connected to the vehicle to allow for selective positioning in a variety of orientations.

The extender frame 14 is formed by tig welding five pieces of one-inch aluminum square tubing 17 to two pieces of "U" channel 15 to form the basic rectangular shape. Hinge elements 26 are mounted on the edge of the frame to mate with hinge halves on the tailgate protector 12. Further strengthening is accomplished by tig welding pieces of three-quarter inch square tubing 19 at strategic locations.

Clasp mechanisms 80 are mounted on the inside face of the extender frame to house the support arms when not in use.

The tailgate protector 12 is positioned directly over the vehicle tailgate 13 and includes a plate area 20 and a lip 22 as illustrated in FIG. 1. The plate 20 is sized to cover substantially the entire inside surface of the. vehicle tailgate and does not interfere with the opening and closing of the vehicle tailgate. A lip section 22 mounts over the upper edge of the vehicle tailgate to provide farther protection to the upper edge of the tailgate. The configuration of the lip 22 may vary from that shown in FIG. 1 depending upon the corresponding configuration of the vehicle tailgate. For example, lip 22 may only include a right angle flange without a reverse bend. In another embodiment, there may be no lip on the tailgate protector.

Hinge elements 23 are fixedly mounted to the upper edge of the tailgate protector for pivotably mounting with the hinge elements 26 of extender frame 14. In one preferred embodiment, there are four tig welded custom hinge elements 23 which receive complimentary hinge elements 26 that are attached to the extender frame 14. The tailgate protector 12 is fixedly attached to the vehicle tailgate by screws or other fastening devices inserted through predrilled and countersunked holes spaced throughout the tailgate protector.

At least one pair of support members extend between the vehicle and the extender frame 14. The support arms function to support the extender frame in each position providing strength in each of the loading-carrying positions.

Figure 2:
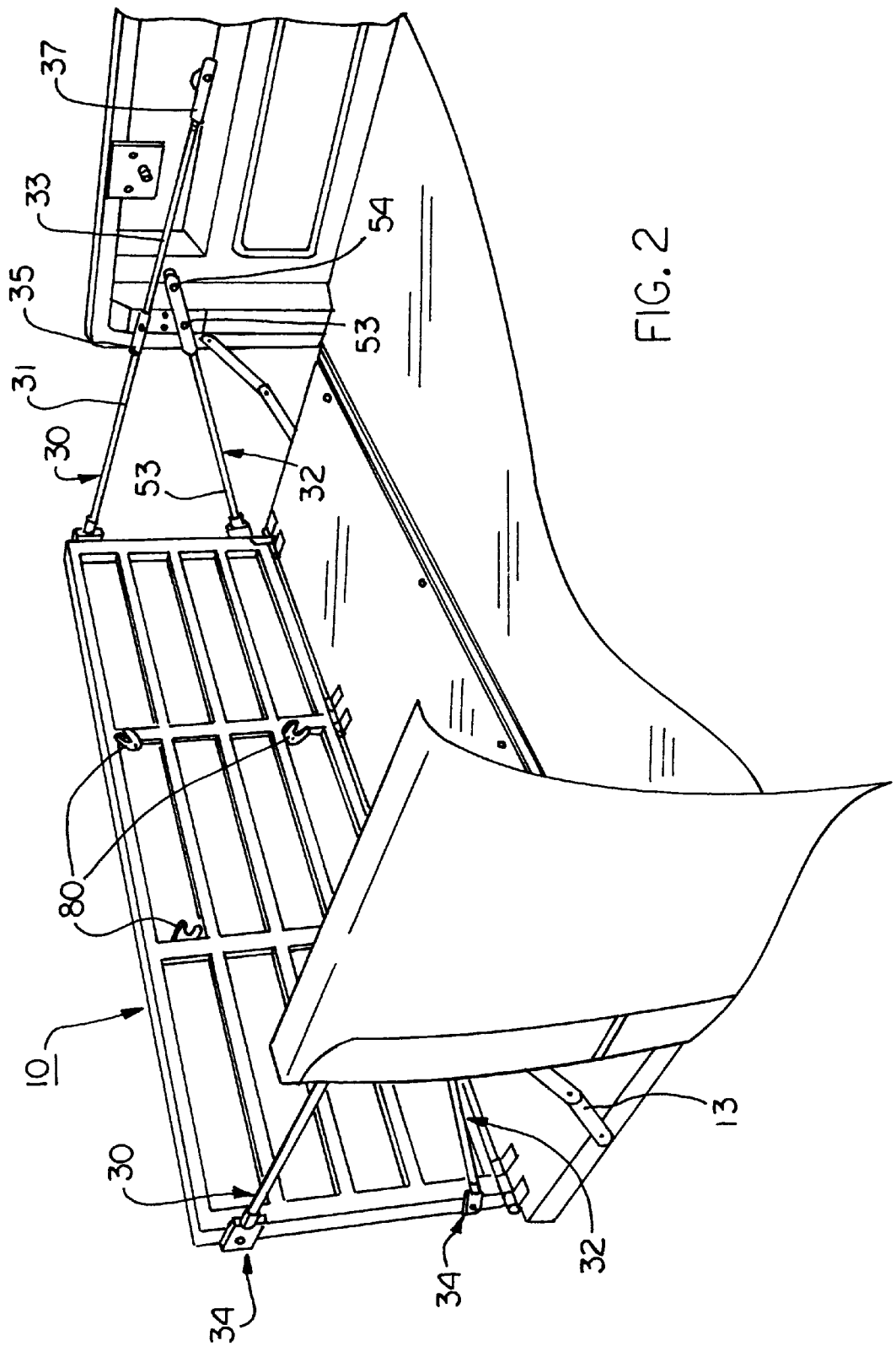
FIG. 2 is a perspective view of the tailgate extension assembly in a second position.

A first pair of support arms 30 includes a first rod 31, a second rod 33, a first catch 35, and a second catch 37 as illustrated in FIG. 2. In one preferred embodiment, the rods 31, 33 are constructed of ⅜ inch stainless steel rods threaded approximately one inch on each end. A pivoting hinge connector 34 is mounted to the extender frame 14 for connecting the support arms. The pivoting hinge provides for movement of the support arms relative to the extender frame between two positions: a first position relative to the edge of the extender frame for aligning the support arms with the vehicle in the relative positions; and the second position relative to the face of the extender frame to allow the support arms to be folded in a storage position, as illustrated in FIG. 4. The hinge 34 further includes an aperture for connecting with the support arms. Preferably, the aperture is threaded to mate with rod 31 and provide for selective adjustment of the support arm length.

Catch mechanisms 35, 37 provide for positioning the support arm in a variety of the orientations. The first catch mechanism 35 includes apertures 41, 43 positioned on the opposite edges for connecting with rods 31, 33, respectively. Preferably, the ends of the rods and the apertures are threaded to provide for selective adjustment of the support arm length. As illustrated in FIG. 5, the catch mechanisms include an aperture 45 and a spring release 47 having a thumb member 50 connected to a spring biased pin 49 which intersects into the aperture 45. In use, the user pulls back on the thumb member 50 against the biasing of the spring moving the pin 49 out of the aperture 45. Upon release of the thumb mechanism 50, the pin mechanism biases forward and again intersects into the aperture 45. Preferably, the first catch 35 and second catch 37 are substantially identical.

A second pair of support arms 32 may also extend between the extender frame 14 and connectors mounted on vehicle. The second pair of support arms 32 provide for additional strength and also prevents the extender frame from buckling upward at the point it is hinged to the vehicle tailgate or tailgate protector 12. The second support arm 32 includes a rod 53 connected with a third catch mechanism 52. As with the first pair of support arms, a pivoting hinge 34 connects the second pair of support arms to the extender frame 14. Preferably, rod 3 provides for adjustment of the length such as threaded ends that mate with the pivoting hinge and catch mechanism similar with the first pair of support arms and is constructed of ⅜ inch stainless rod. The catch mechanism 52 is similar to the catch mechanisms 35, 37 except it includes two apertures 53, 54 positioned along the length and further including thumb mechanism 50 and connected spring-biased pin which intersects with the apertures similar to the catch mechanisms 35, 37 of the first support arms.

The connectors on the vehicle include a post plate 36 and a rail plate 40 which are mounted to the inside of the vehicle bed rail as illustrated in FIGS. 1–4. As illustrated in more detail in FIG. 6, the post plate 36 includes a face plate 62 which includes apertures for inserting fasteners which attach to the vehicle. Studs 56, 60 extend outward from the faceplate for mating with the apertures of the catch mechanisms. Preferably, the studs include a rounded outer or head section 70 and a smaller neck portion 72. This arrangement allows the apertures of the catch mechanisms to fit over the head section 70 and the spring biased pin 49 of the catch mechanism is held in position behind the head section 70 adjacent to the neck portion 72.

In a preferred embodiment, the post plate 36 is constructed of aluminum and mounted with six stainless steel bolts that extend through the faceplate and into the vehicle. The plate has two holes drilled to insert two stainless steel studs from the backside with each stud grooved to accept the spring loaded pin contained in each of the catch mechanisms. All of the mounting holes in the aluminum plate are countersunk and all edges are rounded and softened.

A rail plate 40 is positioned on each vehicle bed rail and includes a faceplate 70 and stud 72. The stud 72 is configured substantially identical to the studs of the post plate for mounting with apertures of the catch mechanism. In one preferred embodiment, the rail plate 40 is constructed of two separate aluminum plates which are pinched together around the bottom edge of the vehicle bed rail and secured by fasteners. The plate includes one stainless steel stud mounted inside the two plates and extends through the outer plate to receive the apertures of the catch mechanisms. In this embodiment, the rail plates require no drilling or tapping into the bed rail of the vehicle.

In use, the tailgate extension assembly provides for four separate orientations, as illustrated in FIGS. 1–4. FIG. 1 illustrates the first position in which both the vehicle tailgate 13 and the extender frame 14 are in horizontal positions. The first pair of support arms 30 are positioned such that the aperture of the second catch mechanism 37 are mounted in the upper stud of the post plate 36 and the second aperture 54 of the catch mechanism of the second support arm is mounted in the lower stud of the post plate. This arrangement provides support to the extender frame to allow a user to place objects on the frame without bending or causing other damage. The second pair of support arms 32 provides additional support and also prevents the extender frame from bending upward at the point where the tailgate connects to the extender frame. This position also provides for the vehicle tailgate 13 to be locked in the horizontal position preventing bouncing of the tailgate when the vehicle goes over bumps.

FIG. 2 illustrates the vehicle tailgate 13 in a horizontal position and the extender frame 14 in a vertical position. The support arms provide strength and support to the extender frame to allow the user to carry objects against the frame again without damage or bending. The first pair of support arms 30 are connected to the vehicle via the aperture of the first catch mechanism 35 mating with the upper stud of the post plate 36 and the first aperture 52 of the catch mechanism of the second pair of support arms mounting with the lower stud of the post plate. This position provides for rear load shift prevention along with rear side to side load loss.

Figure 3:
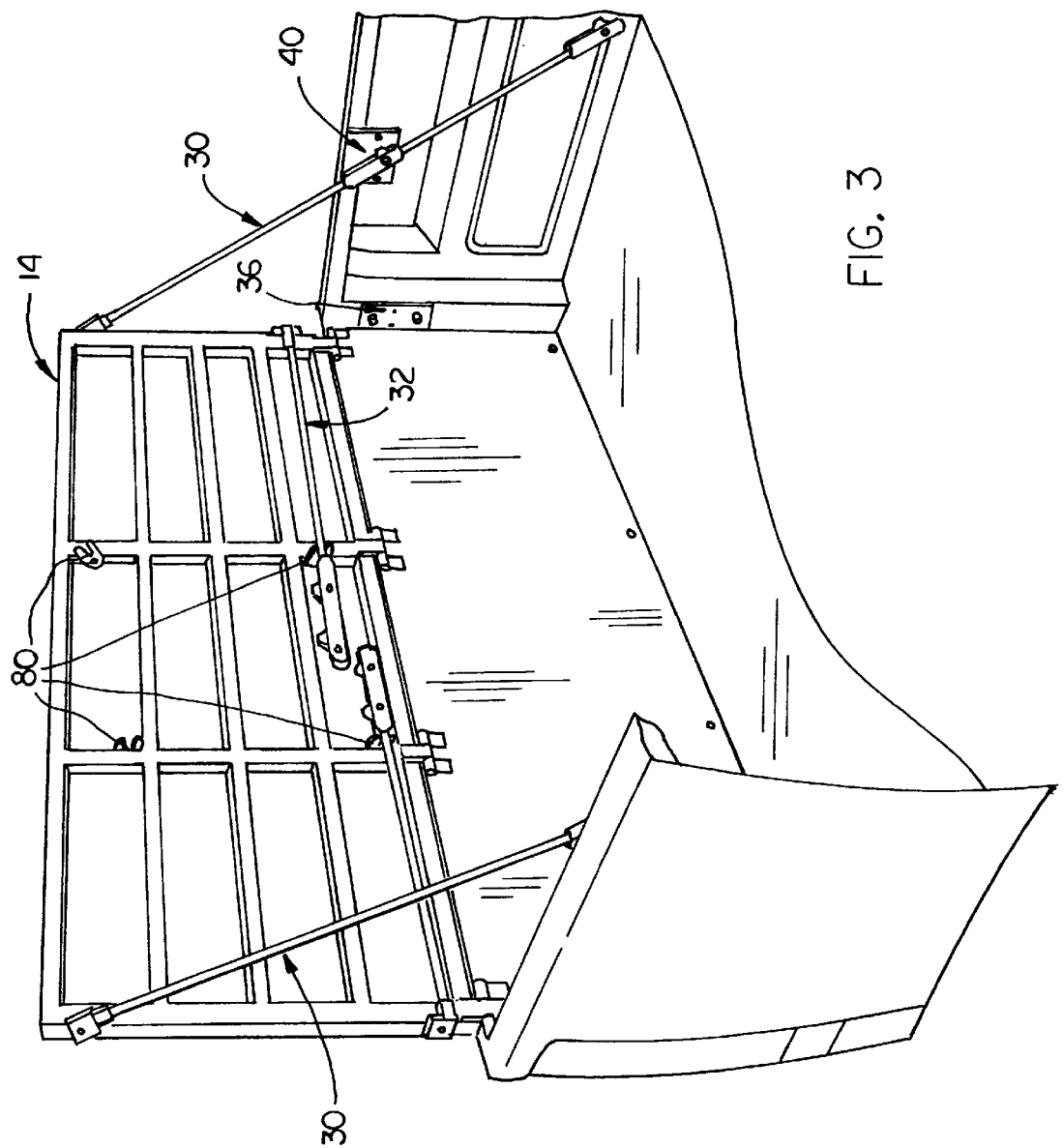
FIG. 3 is a perspective view of the tailgate extension assembly in a third position.

FIG. 3 illustrates a third position in which both the vehicle tailgate 13 and extender frame 14 are in vertical positions. The first pair of support arms 30 are connected to the vehicle via the aperture in the first catch mechanism mounted with the stud of the rail plate 40. The second pair of support arms 32 are not in use in this position and are in a storage position against the extruder frame 14. The extruder frame 14 includes clasp mechanisms 80 which are positioned to house the support arms when not in use. Preferably, the clasp mechanisms are constructed of nylon or other material which deadens the noise. This position provides support for materials that exceed the bed height and prevents taller items from tipping out the back of the vehicle under transportation.

FIG. 4 illustrates a storage position in which the vehicle tailgate is in a vertical position and the extender frame 14 is folded directly adjacent. Both the first pair of support arms 30 and second pair of support arms 32 are folded against the extender frame and held in place by clasp mechanisms 80. The hinge placement on the edge of the tailgate provides for the extender frame 14 to be positioned directly against the vehicle tailgate to occupy a minimum amount of space allowing for the remainder of the cargo area of the vehicle to be used for other purposes.

The terms horizontal and vertical in reference to the placement of the vehicle tailgate and the extender frame are relative terms. These elements are substantially vertical and substantially horizontal in the various positions.

Certain modifications and improvements will occur to those skilled in the art upon a reading of the foregoing description. In a preferred embodiment, the tailgate protector and extender frame are constructed of 6061 aluminum such that the entire invention weighs less than about forty pounds. It should be understood that all such modifications and improvements have been deleted herein for the sake of conciseness and readability but are properly within the scope of the following claims.

We claim:

1. A tailgate extension apparatus for mounting on vehicle tailgates of the type positionable between an open, horizontal position and a vertical, closed position, said tailgate extension comprising a) an extender frame hingedly attached along one edge to the upper end of the vehicle tailgate and being selectively positionable between a storage position in which the vehicle tailgate is in a substantially vertical position and said extender frame is folded adjacent to the vehicle tailgate and a first operable position in which the vehicle tailgate and said extender frame are both substantially horizontally positioned, a second operable position in which the vehicle tailgate is substantially horizontally positioned and said extender frame is substantially vertically positioned, and a third operable position in which the vehicle tailgate is vertically positioned and said extender frame is substantially vertically positioned;

b) support members attached to said extender frame and extending between said extender frame and the vehicle for supporting said extender frame in each of said operable positions; and c) connectors attached to the side walls of the vehicle for selectively receiving said support members to support said extender frame in each of said positions.

2. The apparatus of claim 1, further including a tailgate protector positioned over the vehicle tailgate having a plate section that extends across the surface of the vehicle tailgate.

3. The apparatus of claim 2, wherein said tailgate protector further includes a lip section that wraps about the edge of the vehicle tailgate.

4. The apparatus of claim 3, wherein said extender frame is pivotably connected to said tailgate protector providing for said extender frame to be positioned at a plurality of positions relative to said tailgate protector.

5. The apparatus of claim 4, wherein said extender frame is constructed of aluminum.

6. The apparatus of claim 2, wherein said tailgate protector is attached to said vehicle tailgate via fasteners for holding said tailgate protector in position.

7. The apparatus according to claim 1, wherein at least two pairs of said support members extend between each side wall of the vehicle and each end of said extender frame, said support arms being selectively positionable for providing support to said extender frame in said plurality of positions.

8. The apparatus of claim 1, wherein said extender frame has a width substantially equal to the width of the vehicle tailgate.

9. The apparatus of claim 1, wherein said extender frame has a height substantially equal to the height of the vehicle tailgate.

10. The apparatus of claim 1, wherein said extender frame is constructed of an open grid structure to allow for airflow through said extender frame.

11. The apparatus of claim 1, wherein said extender frame includes hinge elements for pivotably mounting said frame to the vehicle tailgate.

12. The apparatus of claim 1, wherein said extender frame further includes clasp mechanisms for housing said support arms when not in use.

13. The apparatus of claim 1, wherein each of said support arms extend between the vehicle and a pivoting hinge connector attached to an edge of said extender frame, said pivoting hinge connectors allowing for said support arms to fold against said extender frame when not in use.

14. The apparatus of claim 1 further including a plurality of studs extending from each side wall of the vehicle for supporting said support arms in said plurality of positions.

15. The apparatus of claim 14, further including catch mechanisms attached to said support arms, said catch mechanisms including at least one aperture which mates with said studs for supporting said extender frame.

16. The apparatus of claim 15, wherein said catch mechanisms further include a spring biased pin extending into said aperture for engagement with said studs.

17. The apparatus of claim 14, wherein at least some of said support arms include at least two catch mechanisms spaced apart along the length of said support arms, said catch mechanisms providing for selective positioning of said support arms about said studs.

18. The apparatus of claim 17 and further including for extending the storage space of a vehicle comprising:

plates carrying said studs attached to the vehicle for supporting said support arms, wherein said support arms are selectively connected to the studs on said plates for positioning said extender frame in a plurality of positions.

19. The apparatus of claim 18, wherein said plates include a pair of post plates attached to the corner posts and a pair of rail plates attached to the side walls.

20. The apparatus of claim 19, wherein said support arms further include catch mechanisms for connecting with said post plates and said rail plates, said catch mechanisms providing for removably attaching said support arms to the vehicle.

21. The apparatus of claim 20, wherein each of said catch mechanisms include at least one aperture that positions over at least one stud extending from said post plates and said rail plates for supporting said extender frame.

22. The apparatus of claim 18, wherein said extender frame is positionable to extend vertically and horizontally beyond said vehicle.

23. A tailgate extension for mounting on a tailgate on a cargo vehicle, the vehicle tailgate being positionable between an open, horizontal position and a vertical, closed position, said extension mechanism comprising:

a tailgate protector mounted onto the vehicle tailgate;

an extender frame hingedly attached to said tailgate protector for providing movement of said extender frame relative to said tailgate protector; and support arms extending between said vehicle and said extender frame for selectively positioning and supporting said extender frame, wherein said tailgate extension mechanism has a first operable position in which the vehicle tailgate and said extender frame are both horizontally positioned, a second position in which the vehicle tailgate is horizontally positioned and said extender frame is vertically positioned, a third position in which the vehicle tailgate is vertically positioned and said extender frame is vertically positioned, and a fourth storage position in which the vehicle tailgate is in a vertical position and said extender frame is folded adjacent the vehicle tailgate.

* * * * *